United States Patent [19]

Hanke

[11] Patent Number: 5,052,978
[45] Date of Patent: Oct. 1, 1991

[54] ELASTIC COUPLING WITH HYDRAULIC DAMPING DEVICE

[75] Inventor: Wolfgang Hanke, Heidenheim, Fed. Rep. of Germany

[73] Assignee: J. M. Voith GmbH, Fed. Rep. of Germany

[21] Appl. No.: 272,698

[22] PCT Filed: Mar. 10, 1988

[86] PCT No.: PCT/EP88/00184
§ 371 Date: Nov. 14, 1988
§ 102(e) Date: Nov. 14, 1988

[87] PCT Pub. No.: WO88/07147
PCT Pub. Date: Sep. 22, 1988

[30] Foreign Application Priority Data

Mar. 14, 1987 [DE] Fed. Rep. of Germany ....... 3708345

[51] Int. Cl.$^5$ .......................... F16F 15/12; F16F 15/16
[52] U.S. Cl. .................................. 464/24; 192/106.2; 464/68
[58] Field of Search ............................ 192/106.1, 106.2; 464/24, 27, 64, 66, 68; 74/574

[56] References Cited

U.S. PATENT DOCUMENTS

| 2,337,134 | 12/1943 | Thelander | 464/27 X |
|---|---|---|---|
| 4,351,167 | 9/1982 | Hanke et al. | 464/24 |
| 4,601,676 | 7/1986 | Tojima et al. | 464/24 |
| 4,782,718 | 11/1988 | Hartig et al. | 464/27 X |
| 4,788,884 | 12/1988 | Reik et al. | 464/68 X |
| 4,828,533 | 5/1989 | Focqueur et al. | 464/24 |

FOREIGN PATENT DOCUMENTS

| 1425218 | 12/1971 | Fed. Rep. of Germany. |
|---|---|---|
| 2848748 | 8/1980 | Fed. Rep. of Germany. |
| 3329420 | 2/1985 | Fed. Rep. of Germany. |
| 2540583 | 8/1984 | France. |
| 2587076 | 3/1987 | France. |

Primary Examiner—Daniel P. Stodola
Attorney, Agent, or Firm—Ostrolenk, Faber, Gerb & Soffen

[57] ABSTRACT

An elastic coupling in disk construction consists of a coupling half (2) forming a tight inner space (11) which can be filled with damping medium, and a further coupling half (1) comprising an intermediate disk (6) and a hub (3). In addition, there is provided a further coupling element (12) which is connected to both coupling halves (1, 2) by tangentially arranged springs (24, 25, 26) spaced around the circumference. The arrangement is such that, at first, weak first springs (24) for low torque come into play, which first springs are followed by stronger second springs (25) up to the rated torque of the effective range. For still higher torques, the effective range of strong third springs (26) follows. At the circumference of the intermediate disk (6) and of the further coupling element (12) there are radial surfaces (13, 14), which, with corresponding surfaces (15) at the circumference of the interior space, form displacement chambers (16) and bring about a stepwise damping in dependence on the twist angle.

29 Claims, 4 Drawing Sheets

FIG. 2

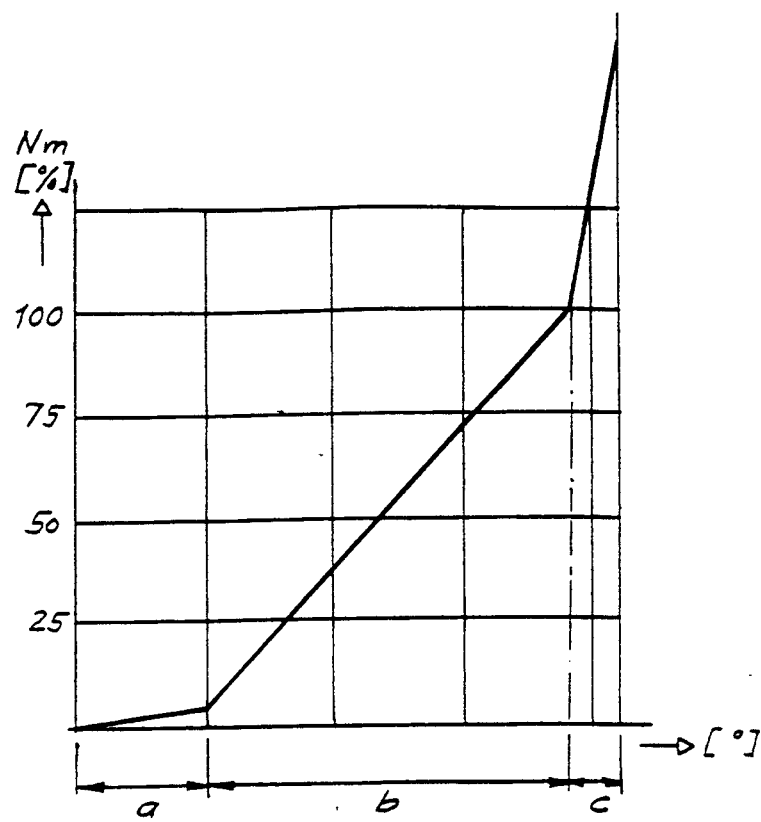
FIG.7
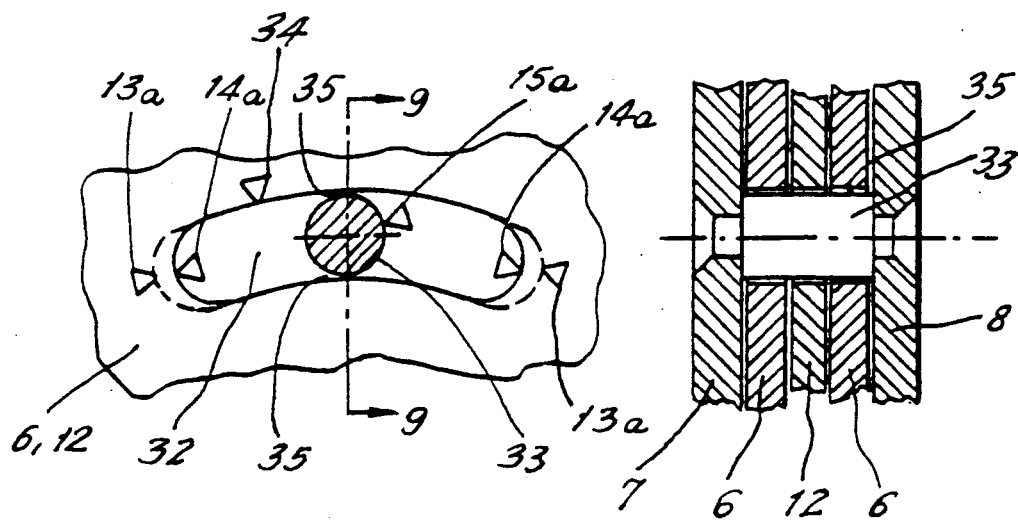
FIG. 9
FIG.8

ELASTIC COUPLING WITH HYDRAULIC DAMPING DEVICE

BACKGROUND OF THE INVENTION

1. Technical Field

The invention relates to an elastic coupling with a multi-disk construction, particularly suitable for a divided flywheel for an internal combustion engine. Couplings of this type typically serve as an elastic connecting element with torsional-vibrational damping between an internal combustion engine and transmission connected behind the engine. The disk-like construction allows a space-saving compact installation of the transmission on the engine.

2. Prior Art

1. Federal Republic of Germany Pat. 28 48 748 corresponding to U.S. Pat. No. 4,351,167 discloses coupling that has two coupling halves, between which are disposed several spiral springs arranged in the circumferential direction; the springs are so connected in their action that they are loaded simultaneously and exhibit a substantially linear torque characteristic over their twist angle. Instead, springs of two different types can be installed and arranged in such a way that, on mutual twisting, one set of springs alone transmits the torque in a first angular range and, starting at a certain twist angle, the other springs are additionally loaded progressively. This known coupling has proven itself in the drives of automatic transmissions in combination with six cylinder engines, and in particular, in diesel engines Four-cylinder and five-cylinder engines, on the other hand, already exhibit a substantially more unfavorable torsional vibration behavior. Further aggravating factors for the coupling are shocks that are conducted through the coupling, for example, via the drive axles and/or the transmission on starting, gear changing and braking. In addition, influences on the torsional vibration behavior of the drive unit stem from differences in construction and configuration of the engines and transmissions of different manufacturers. The known coupling cannot satisfy these very different operating requirements.

SUMMARY OF THE INVENTION

It is the object of the invention to improve the known coupling in its spring characteristic and damping characteristic in such a way that it is suitable for being driven by an internal combustion engine with unfavorable torsional vibrational behavior due to the type of construction of that engine.

This object is achieved by the characterizing features disclosed and claimed herein. In contrast with the known coupling, in the invention, at least one further coupling element is involved in the transmission of torque between the two coupling halves. That further coupling element is also developed in disk form and is provided with window-shaped apertures at the circumference It is connected to the two coupling halves via flexible coupling elements, preferably in the form of springs that are inserted in the window-shaped apertures in such a way that these flexible coupling elements come into action one after another upon twisting. The following advantages are associated with this arrangement wherein a further coupling element is arranged between the side disks of the other coupling halves. The elastic range of the coupling is extended, so that the appropriate stiffness of the coupling is present over every load range. Because the further coupling element is connected to the two coupling halves by successively acting springs, there is a variable mass distribution within the coupling. The mass of the further coupling element, specifically, belongs sometimes to the first and sometimes to the second coupling half, depending on the twist angle. This is especially favorable in the idling condition of the internal combustion engine.

An essential feature of the invention is that damping upon twisting of the two coupling halves is improved. Furthermore, the further disk-shaped coupling element, which forms part of the boundary of a displacement chamber, has at least one surface that extends radially and effective in the circumferential direction that surface essentially corresponds to a similar surface on the first coupling half and is arranged in the same radial position relative to the displacement chamber. The thickness of the further coupling element is selected, at least in the region of the displacement chamber, such that its thickness, together with the thickness of the intermediate disk substantially corresponds to the inside width of the inner space of the second coupling half.

In a first range of rotation-angle (idling), the parts of the intermediate disk together with a radial surface on the second coupling half form a displacement chamber for a weak damping. In a second range of rotation angle (loaded operation), the radial surfaces of the further disk-shaped coupling element, together with the radial surfaces of the intermediate disk and of the second coupling half, form displacement chambers, which give rise to a strong damping. By virtue of the stagewise utilization of the spring action between the participating coupling halves and the further coupling element, variable damping, adapted to the spring bearing the load in each case, is produced in the displacement chambers.

Further, constructive embodiments are described and claimed herein. The further coupling element can be made in the form of two disks which are arranged to either side of the first coupling half, the first coupling half is there developed as an intermediate disk. The further element also is inside the side disks of the second coupling half. Both disks of the further coupling element are connected, by means of connecting elements which penetrate the intermediate disk, to each other in a rotationally rigid fashion, but they are limitedly rotatable relative to the intermediate disk and to the side disks. This embodiment is particularly suitable for applications in which especially good damping is needed even at a small twist angle. This is achieved because each of the disks of the further coupling element is provided with radial surfaces for forming displacement chambers.

In a further preferred embodiment of the invention, the further coupling element is developed as a central. Then the first coupling half with the hub comprises two disks, each arranged between the central disk and the side disks of the second coupling half. This construction has the advantage that the further coupling element, being a central disk, has only a small mass, which belongs to the second coupling half when the drive engine is idling, while at higher rotation speeds, it belongs to the first coupling half with the hub and the two intermediate disks.

Other features of the invention concern constructive developments of the coupling with reference to the arrangement of the springs, the window-shaped apertures therefor, and the damping chambers. According to an aspect of the invention, the effective range of the first springs is between 0° and 8°, preferably 5°; the rotation-angle range of the second springs extends up to a twist angle of 22°, preferably 19°; and the rotation-angle range of the third springs extends over a range of approximately 19°-21°; which is followed by a fixed stop upon further twisting.

In the following, the invention is described with reference to the drawings, which show two embodiments:

BRIEF DESCRIPTION OF THE DRAWINGS

FIG. 7 is a graph of the torque/twist-angle curve;

FIG. 8 is a sectional view in the direction of the rotation axis, through a displacement chamber in another embodiment; and FIG. 9 is a cross sectional view through the displacement chamber of FIG. 8, along the line IX.

DESCRIPTION OF PREFERRED EMBODIMENTS OF THE INVENTION

Figure 1:
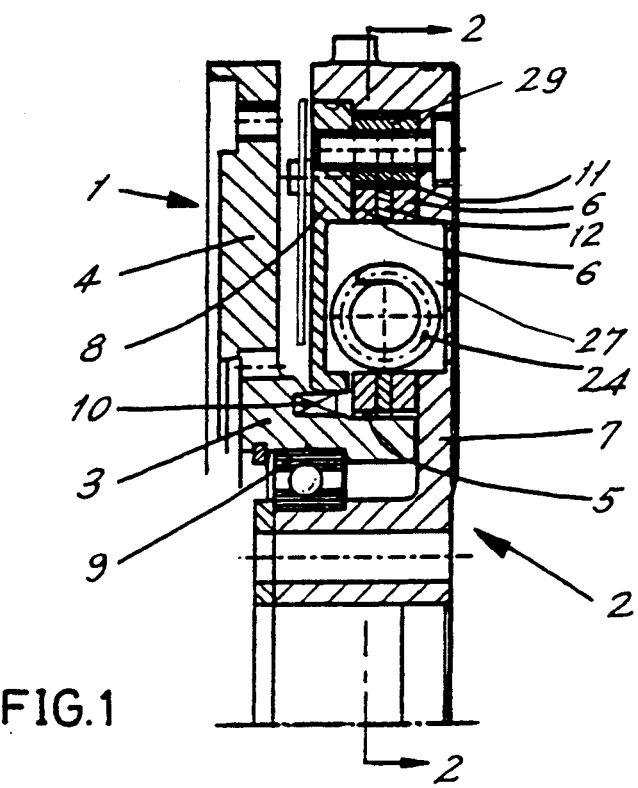
FIG. 1 is a sectional view of a coupling along the line I of FIG. 2.
Figure 2:
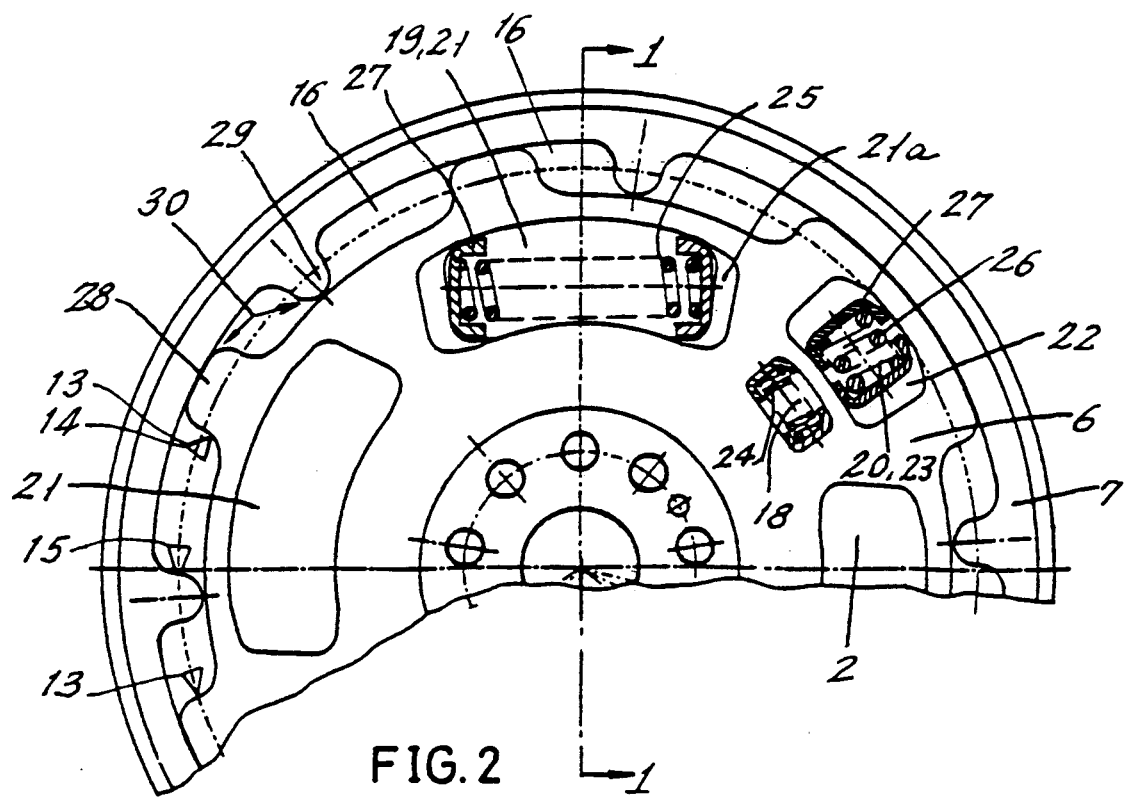
FIG. 2 is a sectional view along the line II of FIG. 1.

The coupling illustrated in FIGS. 1 and 2 comprises a first coupling half 1 and a second coupling half 2. This designation should serve only for clarity and is not a statement of the direction in which force flows through the coupling. The first coupling half 1 comprises a hub 3, which has a flange 4 for connection to a transmission or a clutch (not illustrated). The hub 3 is furthermore provided with toothing 5 for rotary connection with two disks 6 which represent the intermediate disk of the coupling. The second coupling half 2 comprises two side disks 7 and 8 which enclose the two intermediate disks 6 on either side and are connected to each other in a rotationally rigid fashion at the circumference. The first coupling half 1 is connected to the second coupling half 2 via a bearing 9 and a seal 10, so that an interior space 11, tight and fillable with damping medium, is formed. The two intermediate disks 6 enclose between them, with limited twistability, a further disk-shaped coupling element, the so-called central disk 12. At the outer circumference of the intermediate disks 6 and of the central disk 12 there are radial surfaces 13 and 14 which face in the circumferential direction. The second coupling half 2 has, at its circumference facing the interior space 11, radial surfaces 15, pointing radially inward, the shape of which substantially corresponds to that of the radial surfaces 13 and 14. Between the radial surfaces 13 and 14 and the radial surfaces 15 there are displacement chambers 16. The thickness of the two intermediate disks 6 and of the central disk 12 is selected so that, at least in the region of the radial surfaces, it corresponds to the inside width 17 of the inner space 11 between the side disks 7 and 8. Damping of the relative twisting of the two coupling halves comes about, as is known, by virtue of the fact that damping medium is pressed from the one displacement chamber into the other through throttle gap 30 radially outside the intermediate disks 6 and central disk 12 (surfaces 13 and 14) as well as radially inside the side disks 7 and 8 (radial surfaces 15).

Torque is transmitted between the two coupling halves through elastic coupling elements which, as is customary, are developed as coil springs 24-26 and are arranged in the tangential direction inside the coupling in a plurality of aperture 18-23 as follows: The central disk 12 has several window-shaped apertures 18, 19, 20 which are evenly spaced around the circumference and which are present at least in pairs. In the present instance, there are two apertures 18, which lie diametrically opposite each other and into each of which a first spring 24 is inserted. The intermediate disks 6 have similar apertures 18 in the same position and are connected to the central disk 12 by the same springs 24. Both the central disk 12 and also the side disks 7 and 8 of the second coupling half 2 furthermore have apertures 19, into each of which there is inserted a second spring 25 which connects the central disk 12 and the second coupling half 2. Into each of the further apertures 20 in the central disk 12 there is inserted a third spring 26, which engages in a corresponding aperture 23 in the side disks 7 and 8.

The springs 24 are sized in diameter such that they roughly correspond to the inside width (clearance) 17 between the side disks 7 and 8; the springs 25 and 26 each have a diameter that roughly corresponds to the total thickness of all the disks. On both ends of all the springs there are spring 27 for the transmission of the spring force to the disks concerned.

In the region of the apertures 19 and 20 in the central disk 12, the intermediate disk exhibits apertures 21 and 22 which at both ends are larger by an amount 21a than the apertures 19 and 20. In the region of the apertures 20 in the central disk 12, the apertures 23 in the side disks 7 and 8 are at both ends larger, by an amount 23a, than the aperture 20 in the central disk 12. In the present embodiment, the coupling as a whole has four springs 25 as well as two each of springs 24 and 26, which are arranged in a space-saving fashion at different diameters.

The first springs 24 are sized for the transmission of a torque preferably occurring in the idling of the drive engine, which torque is of the order of magnitude of 5 to 10% of the rated torque. The second springs 25 are designed to transmit torque up to the level of the rated torque. The third springs 26 reinforce the second springs 25 upon an impact overload, up to contact, possibly, against a fixed stop.

Figure 3:
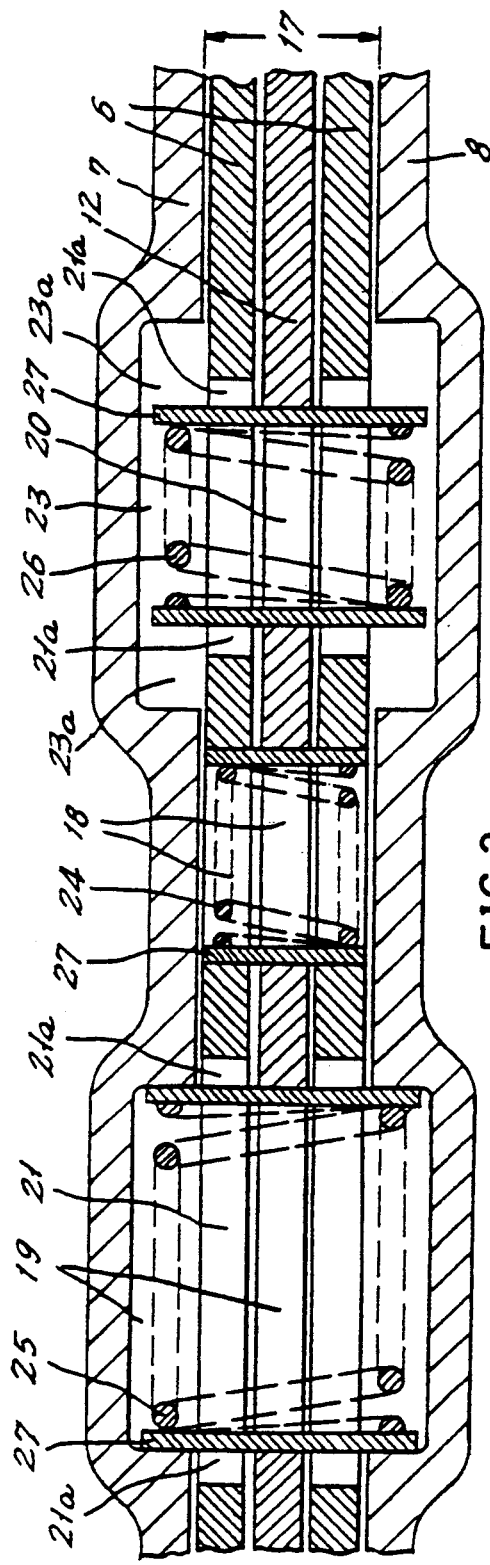
FIG. 3 is a diagrammatic cylindrical sectional view in the position of rest.

FIG. 3 shows diagrammatically, in a cylindrical section, the arrangement of the springs 24, 25, 26 in the apertures 18 to 23 within the side disks 7 and 8, the intermediate disks 6 and the central disk 12, namely in the rest position of the coupling, i.e. without transmission of a torque. The first spring 24 holds the central disk 12 and the intermediate disks 6 fast by means of their congruent apertures 18, while the second spring 25 mutually holds the side disks 7 and 8 fast as well as the central disk 12 by means of the congruent apertures 19, the second spring 25 passing through the apertures 21 in the intermediate disks 6 without engaging them. The intermediate disks 6 are thus so held in position that in both directions of rotation there appears a mobility, specifically by the amount 21a mentioned, which corresponds to a certain twist angle, before the intermediate disks 6 contact the spring cup 27 of the second spring 25. Also on both ends of the spring cups 27 of the third spring 26, the spacing 21a is given in the aperture 22 in the intermediate disks 6. Thus there is produced an unambiguous geometric association of the intermediate disks to the central disk within the side disks 7 and 8 of the second coupling half 2.

Figure 4:
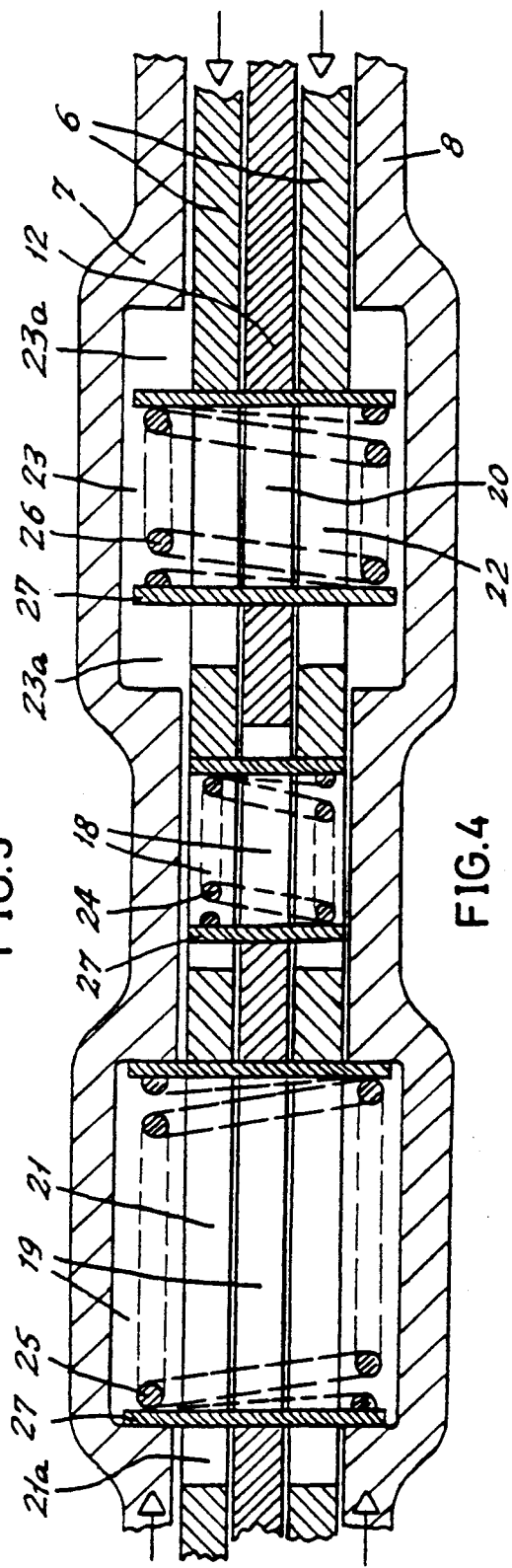
FIG. 4 is a showing in accordance with FIG. 3, after the first phase.

FIG. 4 shows the mutual position of the disks after a first phase a of twisting, the torque being introduced via the side disks 7 and 8 (coupling half 2) and transmitted further via the intermediate disks 6 (coupling half 1). If the spring cups 27 with the second spring 25 are loaded by the side disks 7 and 8 in the direction of the arrows, the circumferential force propagates via the central disk 12 to the spring cups 27 of the first spring 24. The first spring 24, which, as described, transmits small torque and accordingly is sized small, is compressed, while the other spring end rests against the two intermediate disks 6. The relative rotation in this first phase a comes to an end as soon as the intermediate disks 6 have surpassed the amount 21a and come to rest against the spring cups 27 of the second and third springs 25 and 26, the intermediate disks 6 and the central disk 12 having alternately withdrawn from the spring cups 27 by the angular amount a. Simultaneously, the maximum stroke of the first spring 24 is attained.

Figure 5:
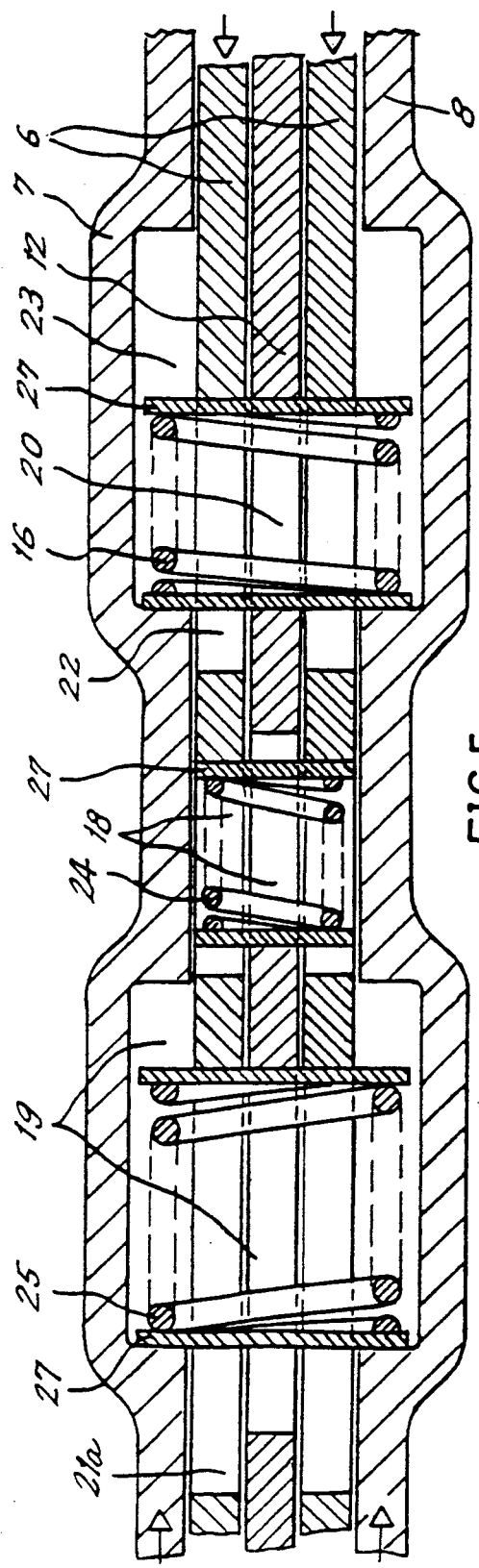
FIG. 5 is a view in accordance with FIG. 3, after the second phase.

FIG. 5 shows the mutual position of the disks within the coupling after the second phase b of twisting. Under the action of the torque, via the side disks 7 and 8 of the second coupling half 2, the second spring 25 is now compressed, the force being transmitted directly through the spring cups from the side disks 7 and 8 to the intermediate disks 6 The spring cup 27 engaging the intermediate disks 6 moves away from the one limiting wall of the aperture 19 on the side disks 7 and 8. A twisting in this phase b comes to an end as soon as, after a twist angle b, the one wall of the aperture 23 in the side disks 7 and 8 has come to rest against a spring plate 27 of the third spring 26. In this phase of movement, the first spring 24 has experienced no further deflection and remains stressed under prestress between the intermediate disks 6 and the central disk 12. In this phase b, only the second spring 25 is involved up to the region of the rated torque.

Figure 6:
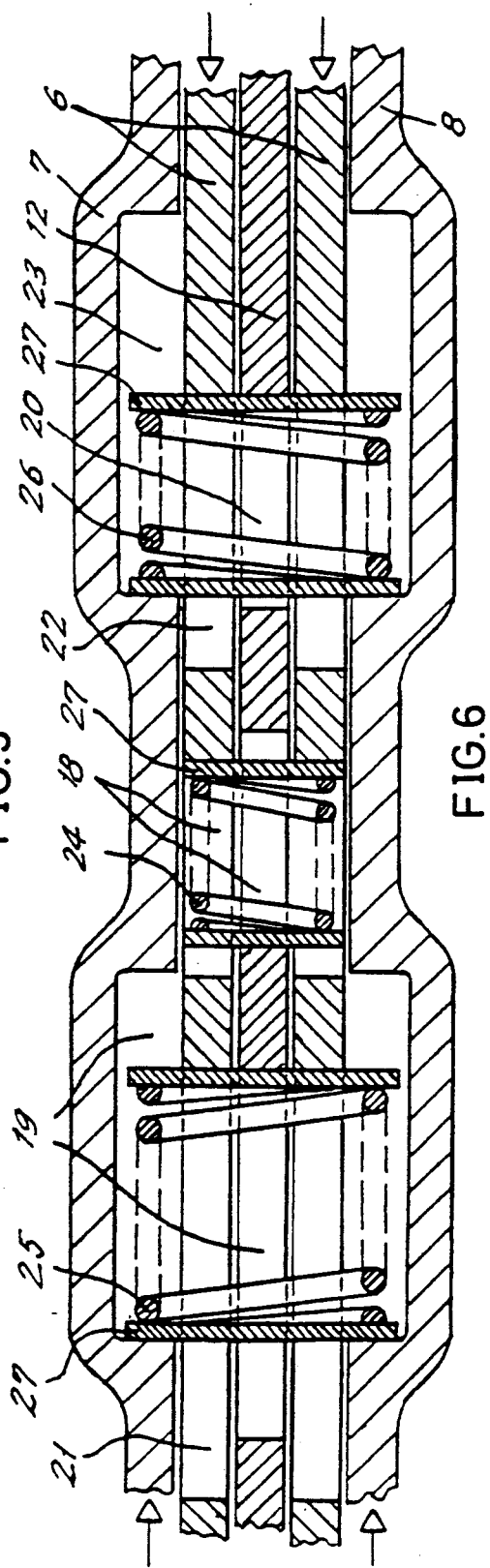
FIG. 6 is a view in accordance with FIG. 3, after the third phase.

FIG. 6 illustrates the third phase c of twisting. In parallel to the force introduction, via the side disks 7 and 8 and the second spring 25 to the intermediate disks 6, the circumferential force is further transmitted via the limiting wall of the aperture 23 in the side disks 7 and 8, via the third spring 26, to the intermediate disks 6, the central disk 12 moving away on the one unloaded side of the aperture 20, from the spring plate 27 of the third spring 26 by the amount corresponding to the twist angle c. In this way, a progressive load sharing of the third spring 26 occurs, in particular, in the case of a torque that suddenly exceeds the rated torque. The first spring 24 remains, as in the preceding phase b, stressed under prestress between the intermediate disks and the central disk. The phase c ends, as known per se, with a fixed stop inhibiting a further twisting.

Since, as described, in the first rotation-angle phase a only a twisting of the intermediate disks 6 relative to the side disks 7 and 8 occurs, the central disk 12 still retaining the state of movement of the side disks, only the radial surfaces 14 of the intermediate disks 6 are involved in damping of the movement excursions. Thus also only a reduced damping in the displacement chambers 16 is associated with the transmission of the low torque (through only the first springs 24). Starting in rotation-angle phase b, on the other hand, the central disk 12 is, as described, associated with the intermediate disks 6 with respect to its relative movement. Consequently, at higher torque, the radial surfaces 13 of the central disk 12 take part in a thereby increased damping in the displacement chambers 16.

Especially advantageous in the coupling of the invention is the fact that in the first rotation-angle phase a, the central disk 12 belongs, by way of the second spring 25, to the mass of the second coupling half 2 with the two side disks 7 and 8. In the embodiment described, the first coupling half 1 is associated, for example, with a transmission; the second coupling half 2, on the other hand, is attached to the flywheel of the engine. In this way, for idling of the drive machine, an increased gyrating mass is effective, which gyrating mass lends improved quietness of operation to the drive unit in idling operation, especially at low rotation speeds. At higher torque, as described, the first spring 24 is prestressed and consequently is, with regard to torsional vibrations, a component of the intermediate disks 6, and is further to be associated with the mass of the first coupling half 1 with the hub. This is again advantageous for operation in the rotation-angle phase b and c.

In modification of the embodiment described, it is further possible to make the amounts 21a and 23a in the intermediate disks and side disks at either end of the first and second springs 25 and 26 unequal. It can, in particular, be advantageous to make the amounts 21a and 23a smaller in the direction of sliding which is opposite to the direction of rotation of the drive, whereby the coupling acquires different characteristics in the two directions of rotation. This can be advantageous in a vibrational-technical sense and further makes it possible better to utilize the available structural space inside the coupling.

It should further be mentioned that, in the first rotation-angle phase a, a series arrangement of the first and second springs 24 and 25 is present, which series arrangement leads to the compression of the first springs 24. At the same time, however, the second spring 25 is also compressed under the action of the same force. Since the first spring 24 is, however, very weakly sized and only two of these springs 24 are present in the coupling, while a total of four springs 25 are provided, the deflection of the second springs 25 in the rotation-angle phase a can practically be neglected and, for this reason, was not further taken into consideration in the description of the functional sequence.

FIG. 7 is a graph of the shape of the characteristic curve of the coupling, specifically the torque as ordinate versus the twist angle as abscissa. In rotation-angle phase a, only the first spring 24 is effective, specifically up to a twist angle of roughly 5° and a torque that corresponds to between 5 and 10% of the rated torque. In rotation-angle phase b, only the second springs 25 are involved, up to a rotation angle of the order of magnitude of 19°, at which the rated torque is attained. This is followed by the rotation angle phase c, which corresponds to an overload and corresponds to a further twist of only approximately 2°, the springs 26 being loaded in addition to the second springs 25. By virtue of this arrangement of springs within a coupling, combined with a stepwise hydraulic damping, there is created a coupling that insures a satisfactory torsional-vibrational behavior even for drive machines with unfavorable torsional-vibrational behavior at low rotation speeds and in partial-load operation.

In FIG. 2 there is illustrated a displacement chamber in which the radial surfaces 13, 14, 15 are simultaneously developed as fixed stops for limitation of the twist angle. For this purpose, the surfaces 13, 14 on the intermediate disks and on the central disk are made as wide shoulders 28, which come into contact with similar shoulders 29 on the second coupling half upon maximal twisting. Between the shoulders 28 and 29, respectively, and the corresponding mating surface there are, in each case, throttle gaps 30 that are controlling for the damping.

A different embodiment of a displacement chamber is illustrated in FIG. 8. There the intermediate disks 6 and the central disk 12 are provided with openings 32, curved in the circumferential direction, which form the displacement chamber, the radial extension of the openings 32 corresponding to those of the radial surfaces 13a and 14a, respectively. Through the openings there extends a component 33, for example a rivet connecting the two side disks 7, 8, with radial surfaces 15a. Between the rivet 33 and the outer curved limiting surfaces 34 there is a throttle gap 35. By suitable curvature of the wall surfaces 34, variable over the twist angle, the throttle gap 35 and thus the damping can be influenced.

FIG. 9 shows a section through the displacement chamber of FIG. 8 along the section line IX. To be noted, above all, are the rivet passing through the openings 32 in the intermediate disks 6 and the central disk 12, the fastening of said rivet to the side disks 7, 8, as well as the throttle gap 35.

In the case of this embodiment, as with the previous embodiment, the radial surfaces 13a, 14a, 15a can be developed as a fixed stop between the two coupling halves 1, 2. Instead, however, a fixed stop can also be attached outside the inner space 11 that is filled with liquid medium, that is, at a totally different point of the coupling.

I claim:

1. An elastic coupling comprising:
   a first coupling half comprising an intermediate disk and a hub connected with the intermediate disk for rotating together with the intermediate disk;
   a second coupling half comprising two axially spaced apart side disks connected to each other in a rigid rotational manner and also rotatable about the hub, the two side disks being at opposite axial sides of the intermediate disk, the intermediate disk and the side disks being so shaped that the side disks extend around the outer circumference of and generally enclose the intermediate disk, and the side disks being of limited rotation relative to the intermediate disk;
   a first plurality of apertures defined in an extending through the intermediate disk and spaced around the circumference of the intermediate disk; an second plurality of apertures defined in the side disks; at least some of the second apertures being located at circumferential locations corresponding to the first apertures;
   a plurality of elastic coupling elements engaging in the first apertures in the intermediate disk and in the corresponding second apertures in the side disks for connecting the coupling halves;
   the side disks defining a liquid-tight inner space for receiving the intermediate disk and the inner space being fillable with a damping medium;
   the inner space having a radially outward region, radially outward of the intermediate disk, at least one displacement chamber defined in the radially outward region by the first and second coupling halves; means on the first and second coupling halves for varying the volume of the displacement chamber upon mutual twisting of the coupling halves which moves the respective volume varying means on the coupling halves; the displacement chamber being fillable with the damping medium; a throttle opening being defined at the displacement chamber for throttling the flow of damping medium into and out of the displacement chamber;
   a further disk disposed in the inner space and being relatively rotatable around the hub with respect to the side disks and with respect to the intermediate disk; a third plurality of apertures spaced around the circumference of the further disk at locations generally corresponding to at least some of the first and the second apertures;
   at least one of the elastic coupling elements being located in the third and first apertures for connecting the further disk to the first coupling half and at least another of the elastic coupling elements being located in the third and second apertures for connecting the further disk to the second coupling half; and the intermediate disk, the side disks and the further disk being shaped and the apertures therein being shaped so that at least the one and then the other elastic coupling element is stressed elastically successively upon twisting of the first and second coupling halves with respect to each other;
   the further disk being at and partially bounding the displacement chamber; a radially extending surface being defined on the further disk and extending into the displacement chamber; a second radially extending surface being defined on the first coupling half and also extending into the displacement chamber; the first and the second radially extending surfaces being arranged in the same radial position relative to the displacement chamber;
   at least in the region of the displacement chamber, the further disk having such a thickness that together with the thickness of the intermediate disk, the combined thickness correspond to the axial width of the inner space;
   a third radial surface on the second coupling half, and circumferentially spaced from the second radial surface to the intermediate disk,
   such that at a first rotation angle of the first coupling half with respect to the second coupling half, the parts of the intermediate disk including the second radial surface form therewith a displacement chamber for weaker damping, and such that at a second, greater rotation angle of the first coupling half with respect to the second coupling half, the first radial surface of the further disk together with the second radial surface of the first coupling half form with the third radial surface a displacement chamber for bringing about stronger damping.

2. An elastic coupling of claim 1, wherein the intermediate disk is comprised of two intermediate disks arranged on the opposite axial sides of the further disk and arranged axially inside the side disks of the second coupling half; connecting elements penetrating the two intermediate disks and connecting the two intermediate disks in a rotational rigid manner and also in a limitedly rotatable manner with respect to the further disk.

3. The elastic coupling of claim 1, wherein each of the disks is centered for rotation around the hub.

4. The elastic coupling of claim 1, further comprising in the radially outward region of the inner space, a first shoulder defined on the first coupling half and a second shoulder defined on the second coupling half, and the first shoulder and the second shoulder being so placed that at the maximum twist angle beyond the rotation angle of the third spring, the first shoulder abuts and serves as a fixed stop for halting further twisting of the first and second coupling halves with respect to each other.

5. The elastic coupling of claim 1, wherein the intermediate disk is comprised of two axially separated disks and the further disk comprises a central disk arranged axially between the two intermediate disks in a limitedly rotatable fashion therebetween.

6. The elastic coupling of claim 5, wherein the elastic coupling elements extend between the first and second coupling halves and the central disk.

7. The elastic coupling of claim 6, wherein the elastic coupling elements comprise at least three springs, and each of the three springs is present at least twice spaced around the circumference of the coupling.

8. The elastic coupling of claim 7, wherein a first of the springs is connected between the first and second coupling halves to be operated over a first, low range of torque and twist-angle between the first and the second coupling halves; a second of the springs being a stronger spring and being connected between the first and the second coupling halves to be operative at a second range of torque and twist-angle for a higher range of torque and twist-angle; and a third of the springs also being a stronger spring, being connected between the first and the second coupling halves and being operative at a third range of torque and twist-angle; and a third of the springs also being a stronger spring, being connected between the first and the second coupling halves and being operative at a third range of torque and twist-angle for a still higher range of torque and twist-angle.

9. The elastic coupling of claim 8, wherein the first spring is inserted in cooperating ones of the third apertures in the central disk and the first apertures in the two intermediate disks;
the second spring being inserted in cooperating ones of the third apertures in the central disk and the second apertures in the side disks of the second coupling half;
the third spring being inserted in cooperating ones of the third apertures in the central disk and the second apertures i the side disks of the second coupling half;
the two intermediate disks, in the circumferential region of the second and the third springs, having apertures which are larger in the circumferential direction than the respective apertures in the central disk by an amount corresponding to the twist-angle range of the first spring;
the side disks of the second coupling half, in the circumferential region of the third spring, having apertures which are larger in the circumferential direction than the apertures for the third spring in the central disk by an amount corresponding to the twist-angle range of the second spring.

10. The elastic coupling of claim 9 wherein the first spring has a width across the inner space that substantially corresponds to the inside width of the inner space in the second coupling half.

11. The elastic coupling of claim 9, wherein the first range of twist-angle of the first spring is between 0° and 8°, the rotation angle of the second spring extends up to a twist angle of about 22° and the rotation angle of the third spring extends over a range of approximately 19°–21°; a fixed stop being defined in the sidedisks for halting further twisting of the first coupling half with respect to the second coupling half after the rotation angle of the third spring.

12. The elastic coupling of claim 11, wherein the first range of twist-angle of the first spring is up to 5°, and the rotation angle of the second spring extends up to a twist angle of 19°.

13. The elastic coupling of claim 9, further comprising a fixed stop defined in the side disks for halting further twisting of the first coupling half with respect to the second coupling half after the rotation angle of the third spring.

14. The elastic coupling of claim 9, further comprising in the radially outward region of the inner space, a first shoulder defined on the first coupling half and a second shoulder defined on the second coupling half, and the first shoulder ad the second shoulder being so placed that at the maximum twist angle beyond the rotation angle of the third spring, the first shoulder abuts and serves as a fixed stop for halting further twisting of the first and second coupling halves with respect to each other.

15. An elastic coupling comprising:
a first coupling half comprising an intermediate disk and a hub connected with the intermediate disk for rotating together with the intermediate disk;
a second coupling half comprising two axially spaced apart side disks connected to each other in a rigid rotational manner and also rotatable about the hub; the two side disks being at opposite axial sides of the intermediate disk;
a central disk disposed next to the intermediate disk, the side disks being at opposite axial sides of the central disk;
the side disks being cooperatingly shaped for defining a radially outward region, radially outward of the intermediate disk and of the central disk, and the radially outward region being liquid-tight and being fillable with a damping medium;
at least one first aperture through the central disk having opposite circumferential ends, at least one cooperating second aperture through the intermediate disk, also having opposite circumferential ends; the first and second apertures being circumferentially and radially so placed as to receive an elastic coupling element, a first elastic coupling element being disposed in and being of a width to extend into the first and the second apertures, the first coupling element and the first and second apertures being so shaped and of a circumferential length that before the first coupling half is twisted with respect to the second coupling half, the first elastic coupling element is in engagement with both of the circumferential ends of the first and the second apertures;
at least one third aperture through the central disk and having opposite circumferential ends; at least one corresponding fourth aperture through the intermediate disk and also having opposite circumferential ends, a fifth aperture in at least one of the side disks and having opposite circumferential ends; the third, fourth and fifth apertures being circumferentially and radially so placed as to receive an elastic coupling element, a respective second elastic coupling element being disposed in and extending across the width of the coupling and being disposed in the third, fourth and fifth apertures; the second coupling element is so shaped and the circumferential ends of the third, fourth and fifth apertures are so placed that before the first and second coupling halves are relatively twisted, the second coupling element is in engagement with the circumferential ends of the third and fifth apertures and is out of engagement with the circumferential ends of the fourth aperture;

a sixth aperture through the central disk and having opposite circumferential ends; a seventh aperture through the intermediate disk and having opposite circumferential ends, and an eight aperture in at least one of the side disks and having opposite circumferential ends; the sixth, seventh and eight apertures being circumferentially and radially so placed as to receive an elastic coupling element, a respective third elastic coupling element being disposed in and extending across the width of the coupling end being disposed in and extending sixth, seventh and eighth apertures; the third coupling element is so shaped and the circumferential ends of the sixth, seventh and eight apertures being respectively so placed that before the first and second coupling halves are relatively twisted, the third elastic coupling element is in engagement with the circumferential ends of the sixth aperture and is out of engagement with the circumferential ends of the seventh and the eighth apertures;

through a first twist-angle of the first and second coupling halves with respect to each other in one direction, the side disks moving in one circumferential direction and the intermediate disk moving in the opposite circumferential direction; at the movement of ht side disks in the one circumferential direction, the second coupling element in engagement with one circumferential end of the third aperture in the central disk moves the central disk in the one direction; the central disk being shifted with respect to the intermediate disk moves the central disk to compress the first coupling element as one circumferential end of the first aperture moves toward the opposite circumferential end of the second aperture, and the first elastic coupling element is compressed while the second and third elastic coupling elements are substantially not compressed;

through a second twist-angle of the first coupling half with respect to the second coupling half greater than the first twist-angle in the one direction, at the fourth aperture, the intermediate disk is moved so that the one circumferential end of the fourth aperture in the intermediate disk is moved toward the opposite circumferential end of the fifth aperture in the side disk and compresses the second coupling element while the first coupling element remains compressed, and the seventh and eighth apertures are larger enough than the sixth aperture in the circumferential direction as to not substantially compress the third coupling element;

through a third twist-angle of the first coupling half with respect to the second coupling half greater than the second twist-angle in the one direction, one circumferential end of the seventh aperture in the intermediate disk is moved toward the opposite circumferential end of the eight aperture in the side disk to compress the third coupling element therebetween while the first and second coupling elements remain compressed;

damping means on the first and the second coupling halves in the radially outward region for acting upon the damping medium in the outward region to provide a relatively weaker degree of damping of the relative rotational motion of the first and second coupling halves through said first twist-angle of the first and second coupling halves; and a relatively stronger degree of damping through said second twist-angle of the first and second coupling halves;

wherein the damping means on the first and second coupling halves comprise:

a displacement chamber defined at the radially outward region of the first and second coupling halves and circumferentially enclosed by the side disks; first radially projecting means on the central disk projecting radially outwardly into the displacement chamber; second radially outwardly projecting means on the intermediate disk and projecting into the displacement chamber and radially inwardly projecting means on the side disk projecting into the chamber; the respective first and second radially outwardly projecting means on the central and the intermediate disks being circumferentially spaced from the radially inwardly projecting means on the side disk defining a displacement chamber between them in which a damping medium is disposed, and each of the radially projecting means being movable circumferentially along with the respective disk thereof, as the disk moves circumferentially during relative twisting of the first and second coupling halves.

16. The elastic coupling of claim 15, wherein the intermediate disk is comprised of two disks arranged on opposite axial sides of the central disk and arranged axially inside the side disks of the second coupling half, the two disks of the intermediate disk being connected for rigid rotation together.

17. The elastic coupling of claim 16, wherein all of the disks are centered for rotation around the hub.

18. The elastic coupling element of claim 15, wherein each of the elastic coupling elements comprises a respective spring.

19. The elastic coupling of claim 15 further comprising in the radially outward region of the coupling halves, a first shoulder defined on the first coupling half and a second shoulder defined on the second coupling half, and the first shoulder and the second shoulder being so placed that at the maximum twist angle beyond the rotation angle of the third spring, the first shoulder abuts and serves a s a fixed stop for halting further twisting of the first and second coupling halves with respect to each other.

20. An elastic coupling comprising:

a first coupling half comprising an intermediate disk and a hub connected with the intermediate disk for rotating together with the intermediate disk;

a second coupling half comprising two axially spaced apart side disks connected to each other in a rigid rotational manner and also rotatable about the hub, the two side disks being at opposite axial sides of the intermediate disk, the intermediate disk and the side disks being so shaped that the side disks extend around the outer circumference of and generally enclose the intermediate disk, and the side disks being of limited rotation relative to the intermediate disk;

a first plurality of apertures defined in and extending through the intermediate disk and spaced around the circumference of the intermediate disk; a second plurality of apertures defined in the side disks; at least some of the second apertures being located at corresponding circumferential locations too the first apertures;

a plurality of elastic coupling elements engaging in the fist apertures in the intermediate disk and in the corresponding second apertures i the side disks for connecting the coupling halves;

the side disks defining a liquid-tight inner space for receiving the intermediate disk and the inner space being fillable with a damping medium;

a further disk disposed in the inner space and being relatively rotatable around the hub with respect to the side disks and with respect to the intermediate disk; a third plurality of apertures spaced around the circumference of the further disk at locations generally corresponding to at least some of the first and the second apertures;

at least one of the elastic coupling elements being located in the third and first apertures for connecting the further disk to the first coupling half and at least another of the elastic coupling elements being located in the third and second apertures for connecting the further disk to the second coupling half; and the intermediate disk, the side disks and the further disk being shaped and the apertures therein being shaped so that at least the one and then the other elastic coupling element is stressed elastically successively upon twisting of the first and second coupling halves with resect to each other;

at least two displacement chamber in the inner space defined at least partially by the first coupling half; the displacement chambers being fillable with the damping medium; a throttle opening being defined at each displacement chamber for throttling the flow of damping medium into and out of the displacement chamber;

the further disk being at and partially bounding the displacement chambers; at least one respective structural part extending into each displacement chamber;

at least in the region of the displacement chamber, the further disk having such a thickness that together with the thickness of the intermediate disk, the combined thickness corresponds to the axial width of the inner space; and at a first rotation angle of the first coupling half with respect to the second coupling half, one said displacement chamber together with a corresponding structural part provides a relatively weaker degree of damping, while at a second, greater rotation angle of the first coupling half with respect to the second coupling half, a second displacement chamber together with a corresponding structural part provides a relatively stronger degree of damping.

21. The elastic coupling of claim 20, wherein the displacement chambers are at least partially defined by said second coupling half.

22. The elastic coupling of claim 20, wherein the inner space has a radially outward region, radially outward of the intermediate disk, and the displacement chambers are defined in the radially outward region.

23. The elastic coupling of claim 20, wherein a first structural member is defined on the further disk and extends into each displacement chamber; a second structural member is defined on the first coupling half and also extends into each displacement chamber; said first and second structural members are arranged at substantially the same radial positions relative to the respective displacement chambers; third structural members are formed on the second coupling half and circumferentially spaced from respective said second structural members on said first coupling half, providing said weaker damping; and the second structural members on the first coupling half together with the first structural members of the further disk are both spaced from said third structural members at said displacement chambers to provide said stronger damping.

24. The elastic coupling of claim 23, wherein said first, second, and third structural members are radial surfaces formed on the further disk, the first coupling half, and the second coupling half, respectively.

25. The elastic coupling of claim 24, wherein said second radial surfaces are formed on the intermediate disk and said third radial surfaces are formed on said side disks.

26. The elastic coupling of claim 20, wherein each displacement chamber is defined by arcuately curved openings in the intermediate disk and in the further disk; said corresponding structural part penetrating the curved openings, the structural part having a radial extent for defining throttle gaps between the circumferentially extending, radially spaced apart wall surfaces of the curved openings and the structural part.

27. The elastic coupling of claim 26, wherein the curved openings are defined by arcuately curved wall surfaces and the curvatures of the arcuately curved wall surfaces are not constant, thereby defining variable radial width throttle gaps.

28. The elastic coupling of claim 26, wherein said intermediate disk is comprised of two axially separated disks and the further disk comprises a central disk arranged axially between the two intermediate disks.

29. The elastic coupling of claim 26, wherein each said structural part is firmly attached to said second coupling half.

* * * * *